United States Patent [19]
Snook

[11] 3,736,568
[45] May 29, 1973

[54] SYSTEM FOR PRODUCING A MAGNETICALLY RECORDED DIGITALLY ENCODED RECORD IN RESPONSE TO EXTERNAL SIGNALS

[75] Inventor: Richard K. Snook, Bridgeton, Mo.

[73] Assignee: Diginetics Incorporated, Bridgeton, Mo.

[22] Filed: Sept. 8, 1971

[21] Appl. No.: 178,755

Related U.S. Application Data

[62] Division of Ser. No. 12,322, Feb. 18, 1970, Pat. No. 3,665,115.

[52] U.S. Cl. ....................340/172.5
[51] Int. Cl. ....................G06f 3/06
[58] Field of Search ....................340/172.5, 174.1 A, 340/174.1 B, 174.1 G; 170/100.1 R

[56] References Cited

UNITED STATES PATENTS

| | | | |
|---|---|---|---|
| 3,293,613 | 12/1966 | Gabor | 340/172.5 |
| 3,209,332 | 9/1965 | Doersam, Jr. | 340/172.5 |
| 3,235,849 | 2/1966 | Klein | 340/172.5 |
| 3,406,378 | 10/1968 | Bradford | 340/172.5 |
| 3,454,930 | 7/1969 | Schoeneman | 340/172.5 |
| 3,573,744 | 4/1971 | Rigazio | 340/172.5 |
| 3,573,745 | 4/1971 | May, Jr. | 340/172.5 |
| 3,588,840 | 6/1971 | Takuya Nomura et al. | 340/172.5 |
| 3,641,502 | 2/1972 | Whitehead et al. | 340/172.5 |

*Primary Examiner*—Paul J. Henon
*Assistant Examiner*—Malvin B. Chapnick
*Attorney*—Robert J. Schaap

[57] ABSTRACT

An apparatus for producing a magnetically recorded digitally encoded record in response to receipt of external signals, such as from a key operated machine capable of generating such external signals. The source of the external signals may be interfaced to an electrical circuit of a recorder forming part of the aforesaid apparatus for producing a magnetic tape record. The recorder generally includes an input register and two internal buffer registers controlling information transfer rates between the keyboard and the magnetic tape unit. A clock oscillator permits transfer from the input register to the buffer registers and from the buffer registers to an output register. An input major cycle counter and an input minor cycle counter is associated with each of the buffer registers for accumulating the number of words in storage. As counts from the two cycle counters are accumulated, the input from a buffer register is transferred to the output register and written on the tape in pretimed relationship to movement of the tape. Thus, the apparatus provides a magnetically recorded record which is readable by digital computing equipment for automatically preparing a transcription of the record.

11 Claims, 15 Drawing Figures

Patented May 29, 1973

3,736,568

9 Sheets-Sheet 4

SYSTEM FOR PRODUCING A MAGNETICALLY RECORDED DIGITALLY ENCODED RECORD IN RESPONSE TO EXTERNAL SIGNALS

This application is a division of my copending application, Ser. No. 12,322, filed Feb. 18, 1970, now U.S. Pat. No. 3,665,115.

BACKGROUND OF THE INVENTION

This invention relates in general to certain new and useful improvements in stenographic apparatus, and more particularly, to an apparatus providing a magnetically recorded digitally encoded tape record which is readable by digital computing equipment for automatically preparing a transcription of the subject matter being recorded.

One of the most effective techniques presently used in preparing transcripts of official records, such as court proceedings and the like, resides in the use of conventional key operated stenographic machines. Other systems involve the use of shorthand codes which require a human agent to write the proceedings in such code for further transcription. Many of the parties recording such proceedings often rely upon conventional tape recorders with microphone inputs in order to audibly record the proceedings. However, such tape records are not admissible as court evidence and can only be used as an assist by the party taking the recording in addition to the stenographic tapes or shorthand notes which are produced at the proceedings.

Oftentimes, there is considerable delay in obtaining the transcription of the proceeding from the stenographer recording the transactions at the proceeding. In many cases, this delay will result in further delays in the institution of further proceedings. In many cases, there is no immediate need for a transcription of the record from the proceeding and the recorded notes resulting therefrom are stored for future use. However, these notes are typically recorded on paper tapes and unless substantial care is exercised in the storage of these tapes, they may be subject to severe deterioration.

It is therefore, the primary object of the present invention to provide an apparatus capable of being interfaced to a conventional key operated stenographic machine for producing a magnetically recorded, digitally encoded record.

It is another object of the present invention to provide an apparatus of the type stated which will produce a magnetically recorded, digitally encoded record readable by digital computing equipment for automatically preparing a transcription of the recorded subject matter.

It is a further object of the present invention to provide an apparatus of the type stated which is highly reliable and nearly silent in its operation and which can be constructed in the form of a small, compact, readily transportable unit.

It is an additional object of the present invention to provide an apparatus of the type stated in which the operation of the keys of the conventional stenographic machine produce a predetermined pattern of indicia recorded on the tape according to a preselected code.

It is also an object of the present invention to provide a method for producing a magnetically recorded digitally encoded record in response to the operation of a conventional key operated stenographic machine.

With the above and other objects in view, my invention resides in the novel features of form, construction, arrangement, and combination of parts presently described and pointed out in the claims.

FIGURES

Figure 4:
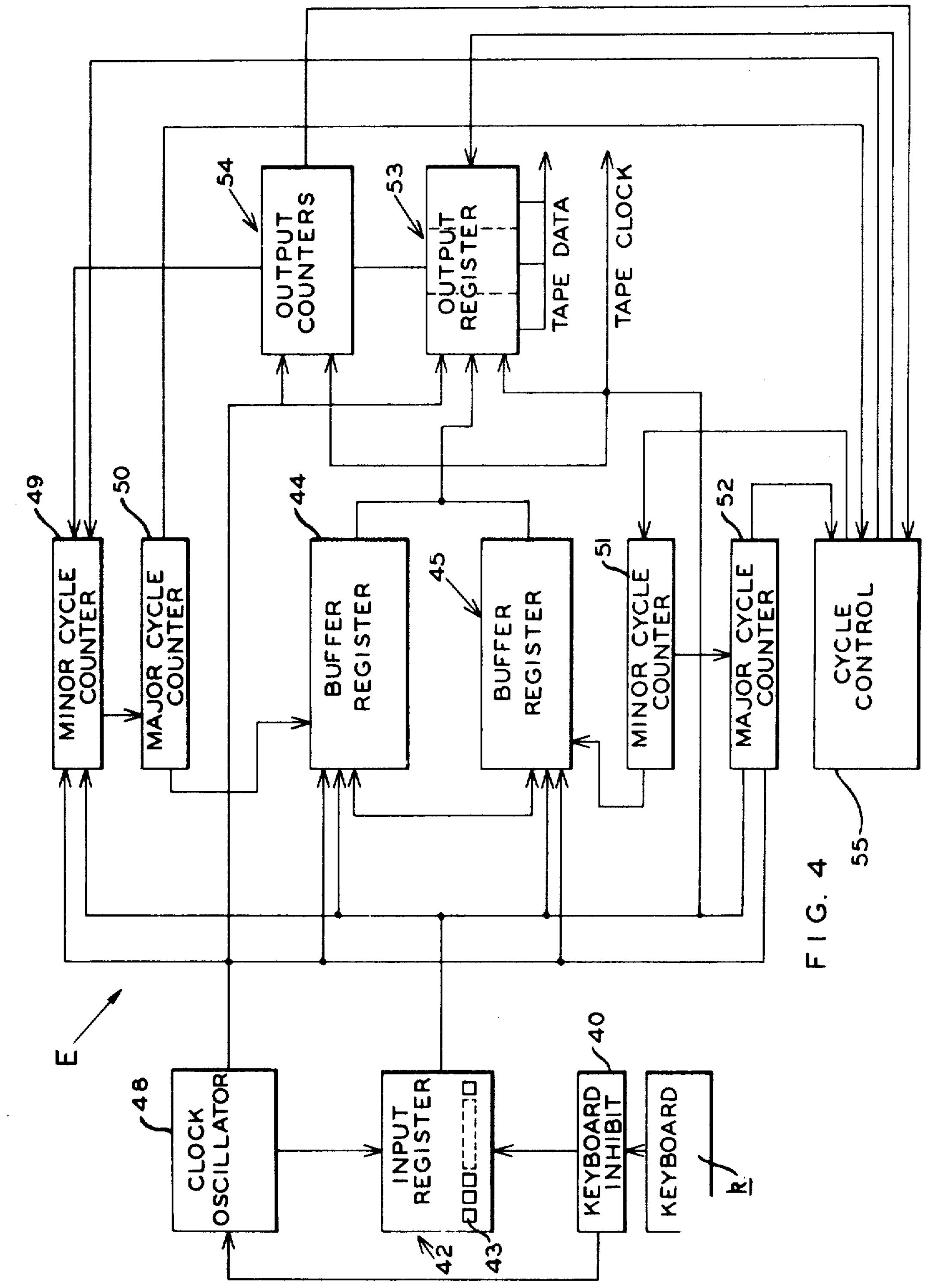
FIG. 4 is a schematic view of the recording circuit forming part of the tape transport of FIG. 2.
Figure 5A:
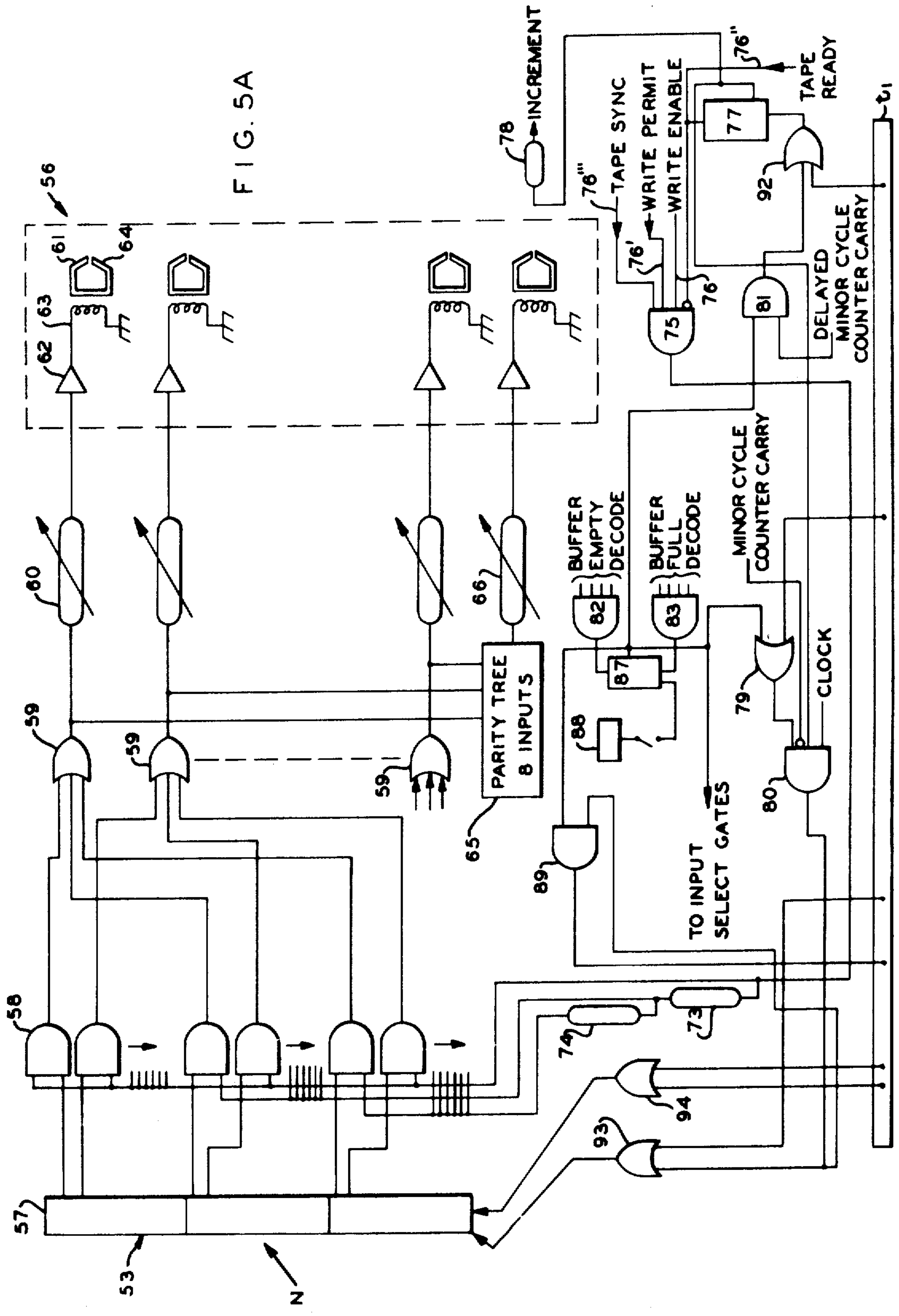
Figure 5B:
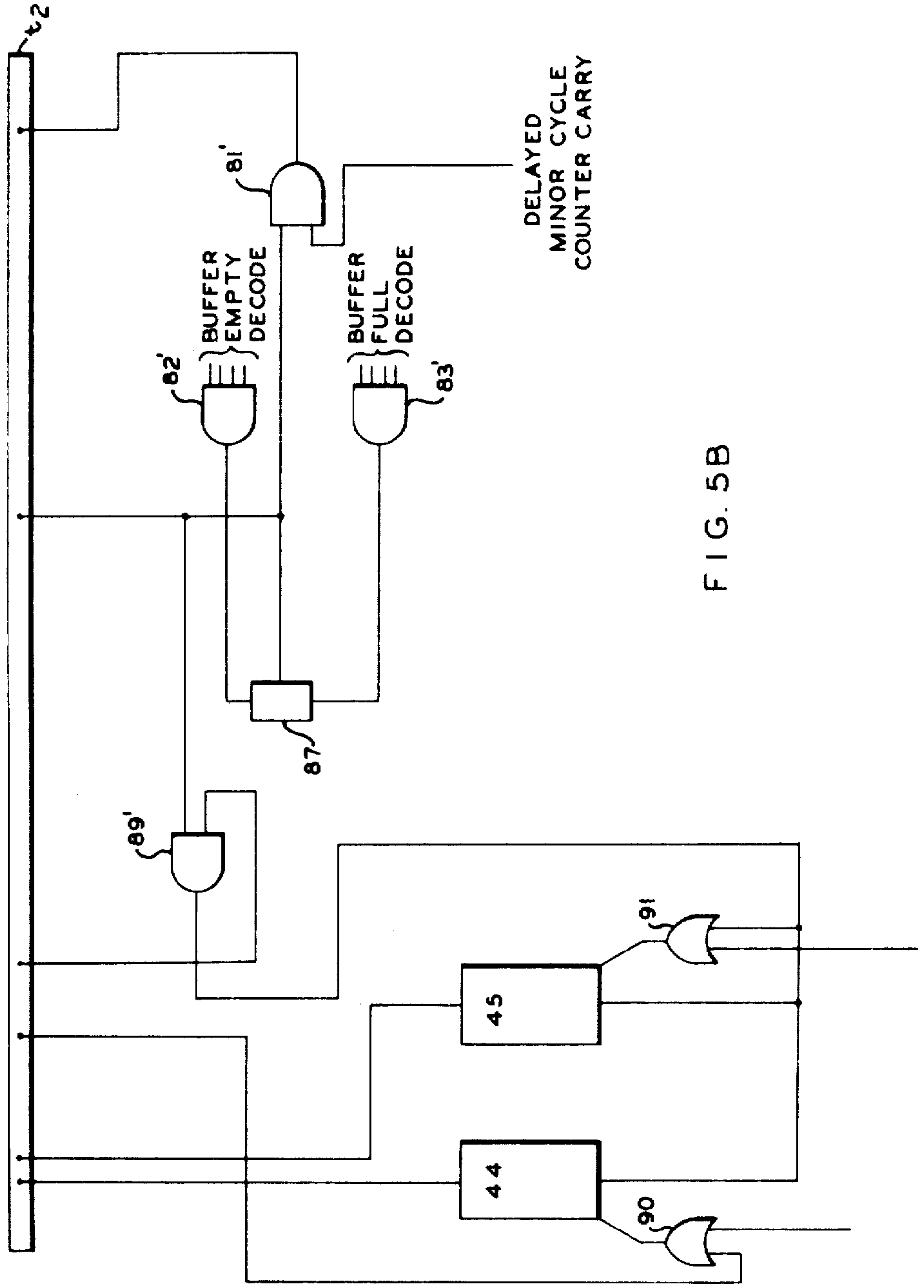
Figure 6:
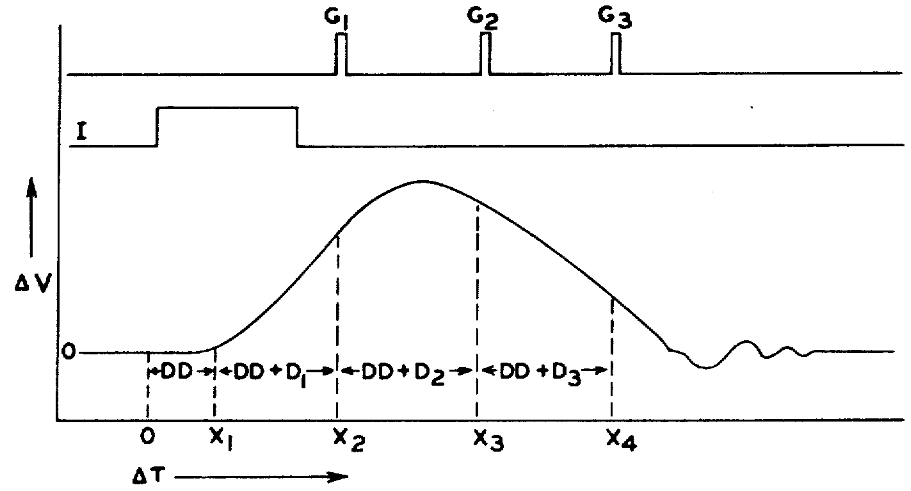
Figure 7:
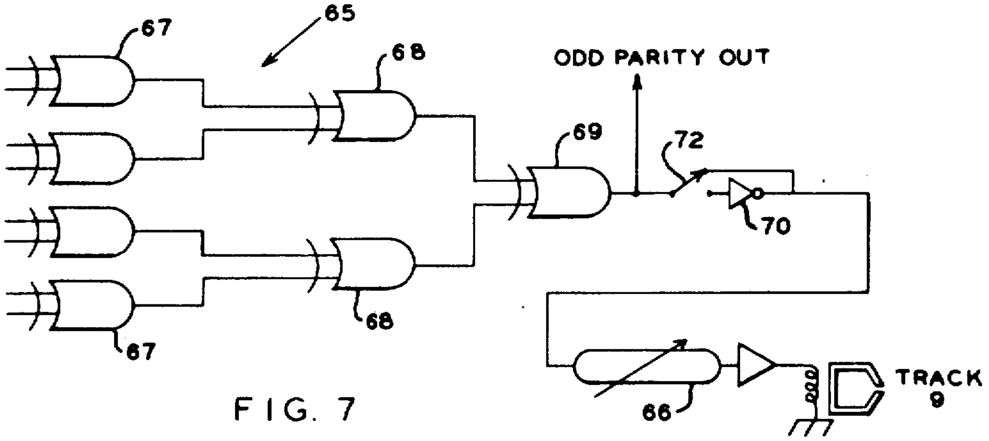
Figure 9:
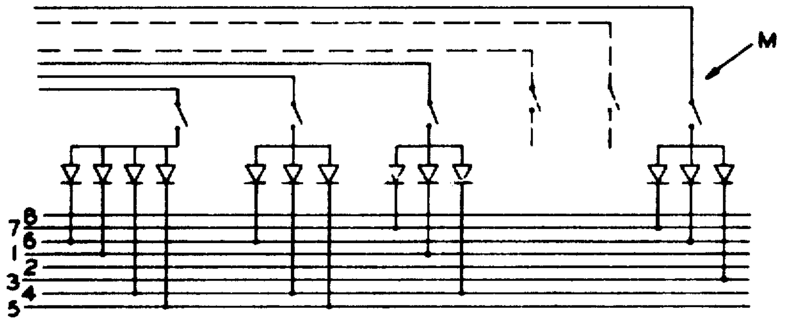
Figure 8:
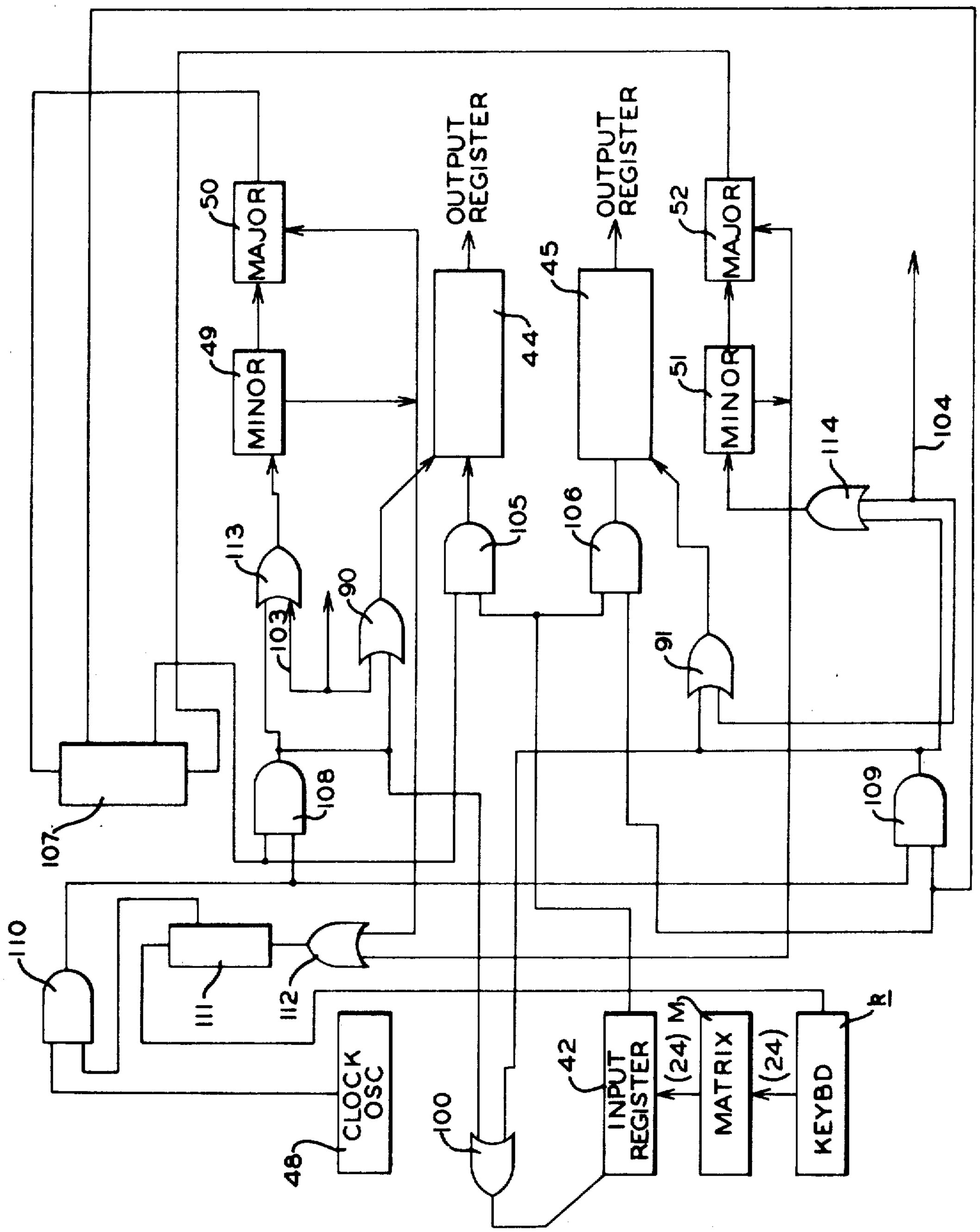
Figure 10:
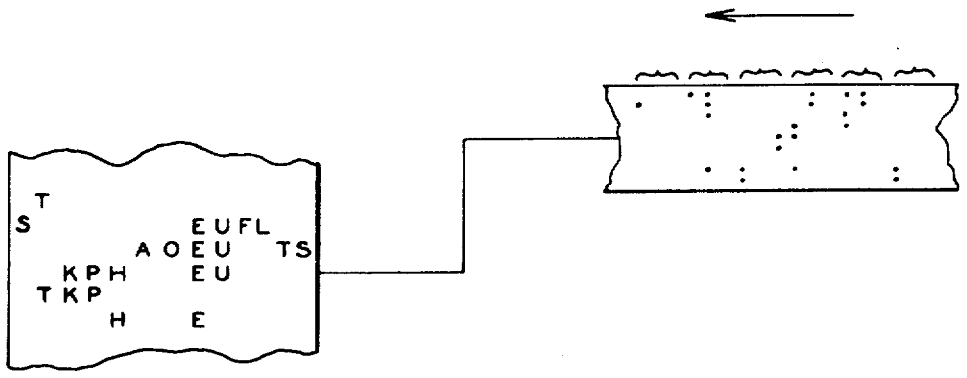
Figure 11:
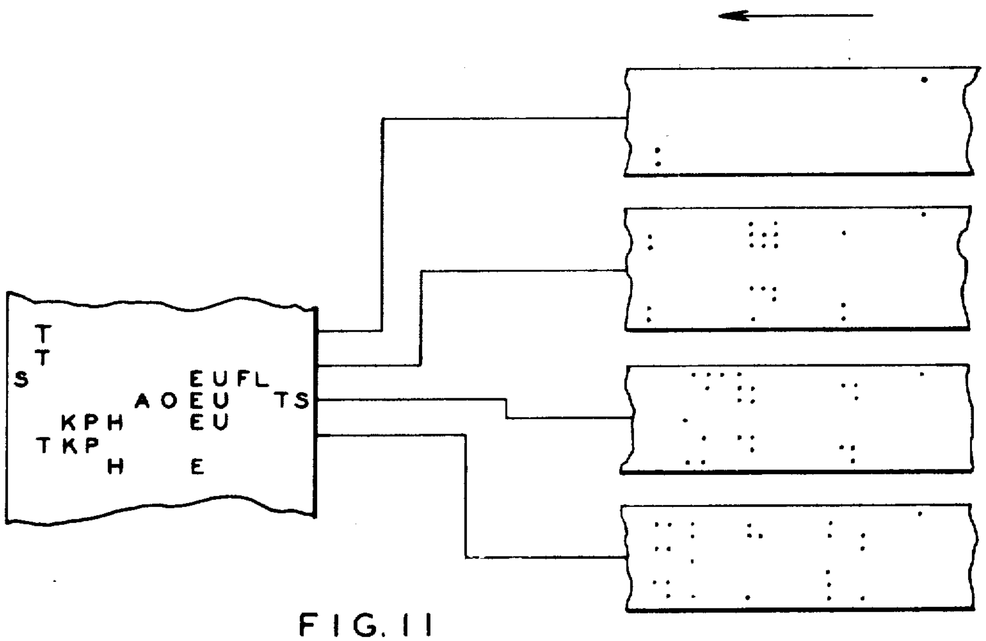
Figure 12:
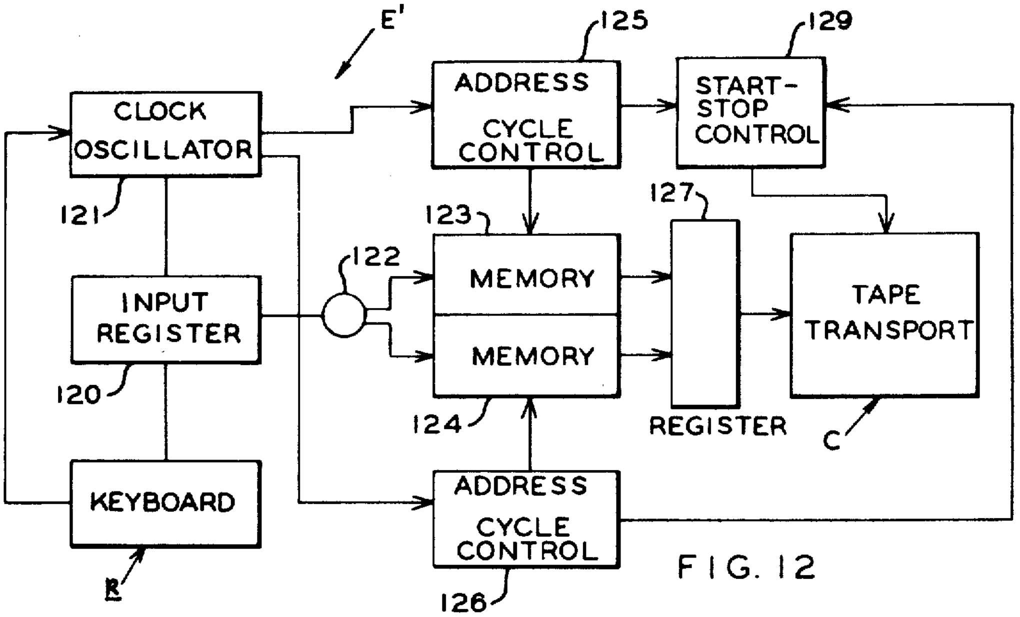
Figure 13:
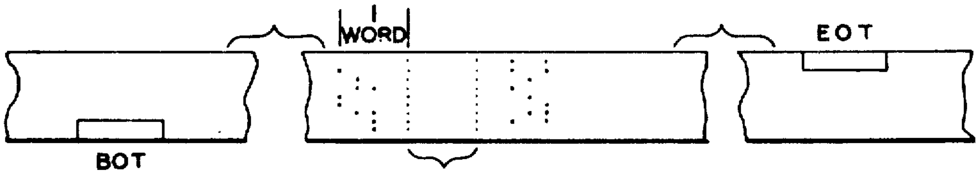
Figure 14:
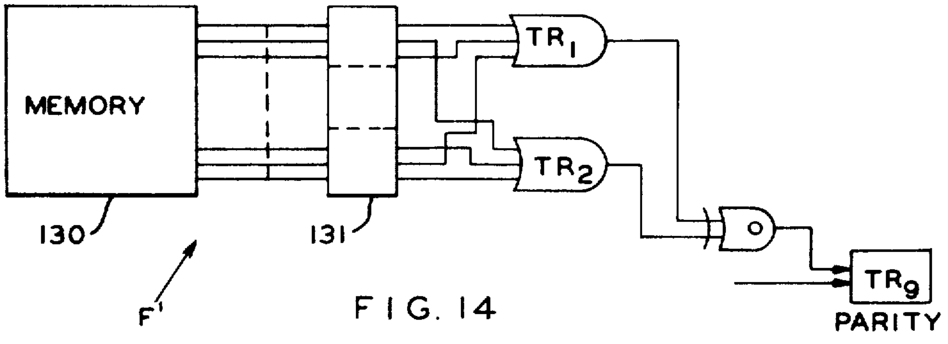

FIGS. 5*a* and 5*b* are a schematic view showing a portion of the electrical circuitry detailing the output circuit of FIG. 4;

FIG. 6 is a composite schematic view showing the temporal relationship of informational data bit sectors on a graph showing tape velocity as a function of recording time;

FIG. 7 is a schematic view showing a parity circuit which is used with the recording circuit of FIG. 4;

FIG. 8 is a schematic view illustrating a portion of the electrical circuitry detailing the input circuit illustrated in FIG. 4;

FIG. 9 is a schematic view of a conversion matrix which may be used with the present invention;

FIG. 10 is a schematic view illustrating the relationship between the printed tape record produced by the stenographic machine and the magnetically recorded record produced by the tape transport of the present invention with one code system;

FIG. 11 is a schematic view illustrating the relationship between the printed tape record produced by the stenographic machine and the magnetically recorded record produced by the tape transport of the present invention with another type of code system;

FIG. 12 is a schematic view of a modified form of recording circuit which can be used with the system of the present invention;

FIG. 13 is a schematic view of the magnetic tape which would be recorded in accordance with the system using the modified form of recording circuit of FIG. 12; and FIG. 14 is a schematic view of a portion of another modified form of recording circuit which can be used with the system of the present invention.

GENERAL DESCRIPTION

Generally speaking, the apparatus of the present invention is usable with a stenographic machine of the type having a plurality of keys which are manually operable in predetermined combination to make a printed record suitable for later transcription. The apparatus includes a digital incremental magnetic tape recording transport with data lines providing for connection to the keyboard of the stenographic machine. The data lines terminate through suitable buffer amplifiers in the inputs of a shift register.

Twenty-three bits of information can be generated by actuation of each of the 23 informational keys on the stenographic machine. The 23 bits are divided into two sequential bytes of eight data bits and one byte of seven data bits. A parity bit is generated for each byte and a control bit is generated for the byte having seven informational bits. Thus, up to 27 bits can be generated for each actuation of keys on the keyboard in predetermined combinations.

A clock oscillator is connected to the shift register with suitable gating to prevent entry of a byte until preceding information has been transferred from an input register to one of two buffer registers or so-called "storage registers." The two internal storage registers are provided to permit optimum information transfer rates between the keyboard and the recording heads of the tape deck.

The data transferred from the input register to the selected storage register is clocked by the internal clock oscillator. Each group of bits is transferred to the selected storage register, the number of words in storage is accumulated by an input major cycle counter associated with that selected storage register. The counter is advanced one count for each group of bits metered out by an input minor cycle counter associated with the selected storage register. The keyboard in the stenographic machine will be inhibited from data transfer while data exists in the input register. This inhibiting function is possible due to the data transfer rate versus the maximum keyboard actuation rate.

At a proper time, the data from the input register will be transferred by suitable gating means to a storage register. The output of the second storage register, which is now full, will be gated to the output register under the control of the clock oscillator and the output major cycle counter associated with the second storage register. The first group of bits corresponding to the data generated by one keyboard operation, which group comprises three bytes of eight bits will be stored in the output register.

The completion of this operation is sensed by the actuation of the major cycle counter output which indicates that the entire data word is now available for recoding. This condition will generate the "Increment" command to the tape transport. As the tape begins to move under control of a capstan or the like in the transport, a series of three pulses are generated from a signal originating within the tape transport system, each of which pulses gates a byte of information to the write head drivers in the transport. This permits the transfer of multiple bytes of data with a single mechanical motion of the tape and still maintains the bit spacing or "packing density" within required limits.

DETAILED DESCRIPTION

Referring now in more detail and by reference characters to the drawings which illustrate practical embodiments of the present invention, S designates a conventional stenographic machine of the type having a keyboard *k* with a plurality of keys 1 which are manually operable in predetermined combinations to produce a printed record suitable for later transcription by the operator or other person knowing the code format used in operating the machine S. The stenographic machine S, is capable of producing a printed record 2, typically in the form of a paper tape. Each separate operation of the stenographic machine S prints a line or horizontal row of characters on the paper tape. One character is produced in each line for each key used in the operation. Each of the characters is typically distinct from the characters produced by each of the other keys on the stenographic machine S. When the keys of the stenographic machine are released, the paper tape 1 is advanced so that the next operation of a group of keys prints its characters in a new line on the tape. In most conventional stenographic machines, certain of the keys may be caused to print a second character which is distinct from all other characters. This printing of the second character is caused by the operation of a shift key which shifts the type face with respect to a printing platen.

Figure 1:
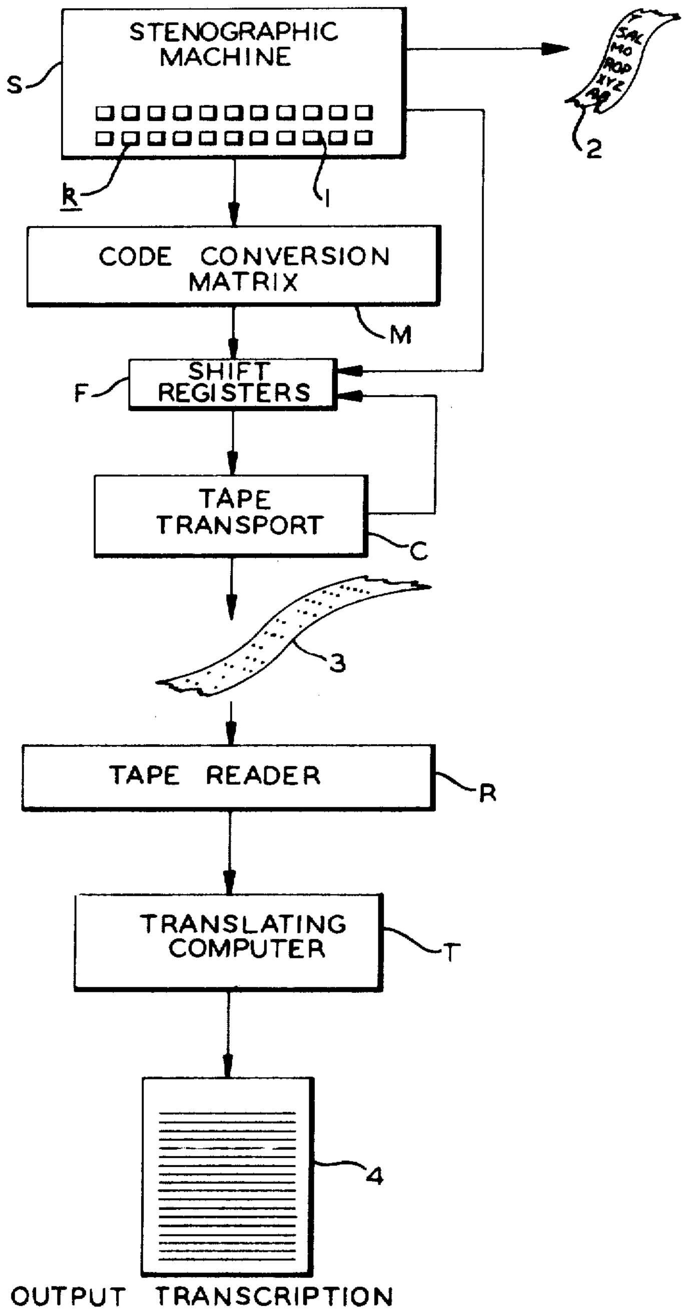
FIG. 1 is a schematic illustration in the form of a flow chart illustrating the various apparatus and steps which are necessary in order to automatically produce a transcription which corresponds to a stenographic record produced by a key operated stenographic machine.

By reference to the flow chart of FIG. 1, it can be seen that the stenographic machine S is connected to a code conversion matrix M, which is, in turn, operatively connected to a suitable shift register structure F which actually forms part of a recording circuit E, the latter being illustrated in FIGS. 4 and 5. The recording circuit E and the shift register structure F included therein is described in more detail hereinafter. The output of the recording circuit E is, in turn, interfaced to the recording mechanism of a tape transport C, which is also described in more detail hereinafter. The tape transport C in conjunction with the matrix, registers and associated control circuitry are capable of producing a magnetic tape record 3, which corresponds to the printed record 2. The keys 1 on the stenographic machine S produce a stenographic record in a first code which corresponds to elements of an intelligible language, namely the code used in the stenographic machine S. Each key represents an intelligible member of this first code. The magnetic tape record includes intelligible members of a second code which is essentially a binary code. The actuation of a key 1 on the stenographic machine S will cause the production of an intelligible member of this second code on the magnetic tape record 3. The magnetic tape record 3 is capable of being read by a tape reader R, which can be interfaced through a translating automatic computer T and which, in turn, is capable of producing an output transcription 4.

Figure 2:
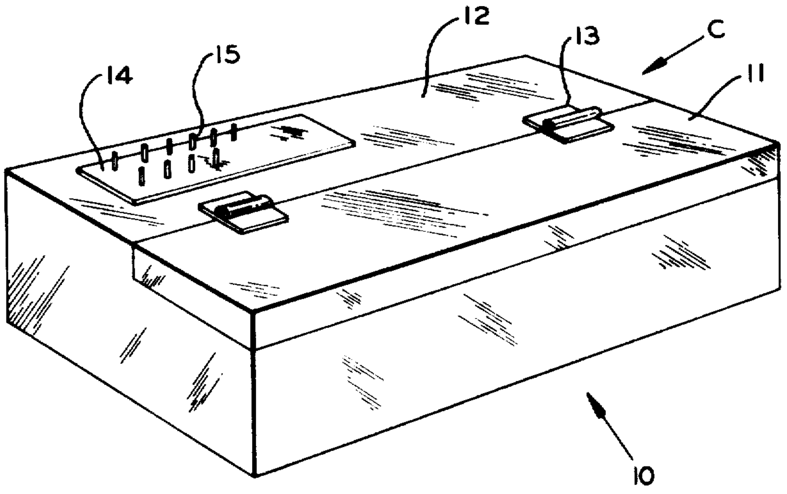
FIG. 2 is a perspective view of a tape transport housing which forms part of the system of the present invention.
Figure 3:
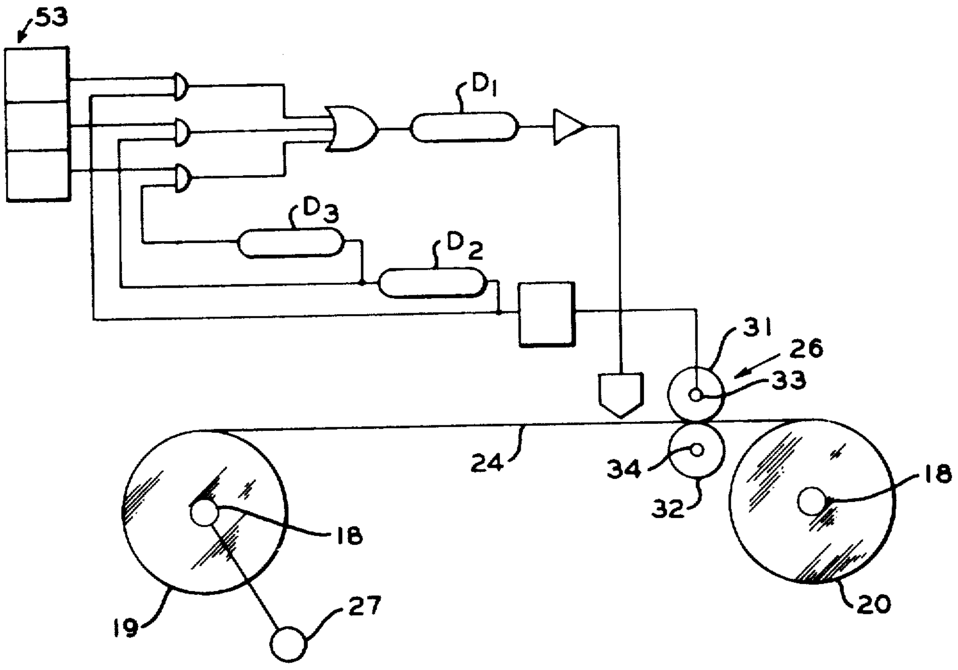
FIG. 3 is a schematic illustration showing the essential components of the tape transport with the essential elements of a recording circuit.

The actual tape transport C, as schematically illustrated in FIGS. 2 and 3 is based on conventional construction and is a digital incremental magnetic tape transport where the tape is advanced by a discrete step when an increment signal is received by the transport. When the signal is received, the tape is advanced exactly one increment, thereby placing an unrecorded section of the tape in position for receipt of future data. The tape transport C may be constructed for rack-size compatibility and is completely self-contained.

The tape transport C generally comprises an outer housing 10, which is provided with a hinged swingable plate 11, enabling access to the interior thereof for insertion of a conventional tape cassette (not shown). The swingable top plate 11 is secured to a top wall 12 by means of hinges 13 in the manner as illustrated in FIG. 2. Rigidly secured to the top wall 12 of the housing 10 is a terminal strip 14, having a plurality of contacts 15 capable of accepting conventional conductors (not shown) for a purpose to be hereinafter described in more detail.

The drive components contained in the tape transport C are essentially conventional in construction and therefore neither illustrated nor described in any detail herein. Mounted internally within the housing 10 by means of suitable bearings (not shown) are a pair of transversely extending longitudinally spaced spindles 18. A conventional tape cassette (not shown) is capable of being removably mounted on the spindles 18 in such manner that the spindles 18 engage a supply spool 19 and a take-up spool 20, which are located internally within the cassette. The magnetic tape passes into and out of the cassette housing through elongated apertures conventionally provided in such cassettes. It should be recognized, that conventional tape reels could be used in place of the cassette. However, it has been found in connection with the present invention, that tape cassettes provide convenient handling, and lend themselves to rapid interchangeability as well as provide a convenient storage medium.

A simple switch or pair of contacts (not shown), can be operatively located under each key 1 of the stenographic machine S, so that a circuit can be completed upon actuation of any one or more of the keys 1. The magnetic tape 24 is advanced to new unrecorded sections thereof by means of a tape advance mechanism 26. A step latch motor 27 provides proper tension on the one spindle 18 and hence on the supply spool 19. A mechanical brake tension mechanism (not shown) may also be conventionally provided for the supply spool 19 or the take-up spool 20.

The tape advance mechanism 26 generally comprises a pressure drive roller 31 and an idler roller 32 which engages upper and lower surfaces of the tape 24 in the manner as illustrated in FIG. 3. The lower idler roller 32 is mounted on an idler shaft 33 and the upper drive roller 31 is mounted on a shaft 34 which is driven by means of a synchronous magnetic-latch step motor (not shown). The step latch motor is energized in a manner hereinafter described to cause the roller 31 to rotate in the clockwise direction so that the tape 24 is advanced in the direction of the arrow in FIG. 3. It should be recognized that the tape transport C of the present invention is not limited to a drive motor and pinch roller mechanism described herein; but any other type of incremental tape advance mechanism, known in the art could be employed. For example, it is possible to employ a ratchet which is actuable by a pawl, the latter being shifted in response to energization of a solenoid. The magnetic tape transport which is employed in the present invention, is preferably a nine track format unit, although seven track tape format could be employed as well, by slight changes in the recording circuit E. The ends of the tape 24 would include terminal markers in the form of reflective foil which is secured to the tape 24 by means of pressure sensitive adhesives. Accordingly, when the tape 24 is used, the tape 24 would be advanced sufficiently so that the first character to be recorded thereon is located at a proper position with respect to the beginning of the tape 24.

The recording circuit E which is illustrated in FIGS. 4 and 5 includes therein the shift registers F schematically illustrated in FIG. 1. The recording circuit E could be fabricated in the form of printed circuits and located in the housing 10 of the tape transport C. As indicated previously, a set of contacts would be located beneath each of the keys 1 on the keyboard *k* of the stenographic machine S. The output of the keyboard *k* is transferred through a keyboard inhibit gating system 40 which is provided for added assurance of interference isolation. In this manner, the keyboard *k* will be inhibited from data transfer while data may exist in an input register to be herinafter described. The inhibition is accomplished by "anding" a synchronizing line in the keyboard *k* with an input minor cycle counter to be hereinafter described.

The input of the keyboard inhibit 40 is connected to an input register 42, the latter containing 24 serially aligned flip-flops 43 connected in such a way as to form a shift register with parallel entry and serial output. The keyboard *k* of the stenographic machine S typically contains 23 major keys 1 for producing any of the 23 characters representative of a sound. It is, of course, possible to press all 23 keys simultaneously to "set" all 23 data bits of information to the "ones" state. These bits of information are generated in parallel and transferred through the keyboard inhibit 40 into each of the flip-flops 43 in the input register 42. Accordingly, the number of data bits "set" will be equivalent to the number of keys 1 actuated simultaneously. The 24th flip-flop 43 is designed to carry a synchronizing pulse or so-called "control bit" for purposes of proper timing in the computer reading function. This 24th bit or control bit is generated upon each actuation of any one or more keys 1 for purposes of positional control. It can be seen that all of the bits from the keyboard *k* are entered into the input register 42 in parallel. A portion of the input circuit illustrated in FIG. 4 is detailed in FIG. 8 and described in more detail hereinafter.

It can be seen that simultaneous actuation of any one or more of the keys 1 on the keyboard *k* will generate twenty-three bits of information; the number of bits set to the one state being equal to the number of keys 1 actuated. For purposes of recording this information on the tape 24 in proper timed relation to the incremental advance of the tape 24, the 23 data bits are divided into three bytes. A parity bit will be generated for each of the three bytes in a manner to be hereinafter described in more detail. Thus, the first byte will contain eight data bits and one parity bit; the second byte will contain eight data bits and one parity bit; and the third byte will contain seven data bits and one parity bit. The third byte will also contain the control bit which is generated at the keyboard *k*. Furthermore, the 27 total bits in the three bytes will be considered to represent one "word."

The nine bits in any particular byte will be recorded on the tape 24 in a direction transverse to the direction of movement of the tape 24 in the transport C. Since a nine track recording head will be used in the tape transport C, each of the nine bits to be located in a transverse position on the tape will be recorded simultaneously. The three successive bytes representing one word will be recorded consecutively on the tape 24. Since the third byte contains the control bit, the reading of the control bit by any translating computing equipment will indicate the end of one word. However, the three parity bits are not generated until after the informational bits are passed through an output register to be hereinafter described.

The input register 42 actually serves as a parallel to serial converter and the output of this register 42 is transferred to either a first buffer register 44 or a second buffer register 45, in the manner as illustrated in FIG. 4. Each of the buffer registers 44, 45 are essentially internal storage shift registers and each contain two hundred and forty bit positions, so that each of the registers 44, 45 may hold a maximum of 10 words (30 bytes of eight bits; the parity bits for such bytes not having yet been generated) at any point in time. These two internal registers 44, 45 are provided to permit optimum information transfer rates between the keyboard *k* and the tape transport C. It has been found necessary to provide this type of buffer storage system in order to satisfy the requirements for packing density and control as required.

A clock oscillator 48 is connected to the input register 42 to generate the shift pulses to transfer the information from the input register 42 to either one of the buffer registers 44, 45. In like manner, the clock oscillator 48 is connected to the shift bus of each of the buffer registers 44, 45 for shifting the information in these registers 44, 45, in a manner to be hereinafter described in more detail. A first five bit minor cycle counter 49 and a first four bit major cycle counter 50 are associated with the first buffer register 44. In like manner, a second five bit minor cycle counter 51 and a second four bit major cycle counter 52 are associated with a second buffer register 45, in the manner as illustrated in FIG. 6. Each of the minor cycle counters 49, 51 are also provided with clock pulses from the clock oscillator 48. The clock oscillator 48 is a stable high frequency pulse source, preferably greater than 1 mega. P.P.S., which is designed to provide shift pulses to perform all data transfer operations within the system except the output to tape. When a full 24 bits representing 23 data bits and the control bit (excluding parity bits) to depict one word have been entered into the input register 42, the clock oscillator 48 under control of the minor cycle counter 49, will provide the 24 shift pulses necessary to introduce this word into the first buffer register 44. This process will continue until all of the bit positions in the buffer register 44 have been filled.

The minor cycle counter 49 will determine how many shift pulses have been accepted from the clock oscillator 48 in order to transfer the set of bits which have been transferred from the input register 42 into the buffer register 44. In each case where 24 shift pulses have been metered by the clock oscillator 48, the minor cycle counter 49 will cause a generation of a count pulse to the major cycle counter 50. Accordingly, when 10 words of 24 bits have been introduced into the buffer register 44, the major cycle counter 50 will have an accumulated count of 10. At this point in time, the buffer register 44 has been filled with informational bits to its capacity. Furthermore, it should be observed that the number of words in storage in the buffer register 44 has been accumulated by the input major cycle counter 50. The data transfer from the input register to the selected buffer register 44 or 45 takes place at a high rate of speed so that little interference is possible from the next word being entered from the keyboard *k*.

After the first buffer register 44 has been filled with informational bits, two additional functions occur simultaneously. The first of these functions is that additional words from the keyboard *k* are introduced into the second buffer register 45 through a suitable gating structure (not shown). The second function which occurs simultaneously with the first is that the information in the first stage buffer register 44 is serially transferred through a suitable gating structure (FIG. 7) to an output register 53. In order to accomplish this function, a sufficient number of shift pulses (240 shift pulses in 10 groups of 24) to transfer the information from the buffer register 44 into the 24 bit storage capacity output register 53 are gated from the clock oscillator 48 by gating means controlled by the major and minor cycle counters.

As 24 bits of information contained in the buffer register 44 are transferred to the output register 53, the first minor cycle counter 50 will provide a pulse, which will, in turn, subtract one count from the total count stored in the first major cycle counter 50 to thereby reflect the number of words currently in storage in the first buffer register 44. This process will continue until such time as the subtract pulse from the output minor cycle counter 49 produces a count of zero in the input major cycle counter 50. At this time, transfer of shift pulses from the clock oscillator 48 will be inhibited and no further increment command will be transferred to the tape transport C. An output counter system 54 may be employed for counting the shift pulses used to process the data contained in the output register 53 to the tape transport C. By further reference to FIG. 4, it can be seen that the output counter 54 is connected to the clock oscillator 48, the major and minor cycle counters previously described and a cycle control 55. The cycle control 55 is also connected to the first and second state minor and major cycle counters as previously described, as well as the output register 53, in the manner as illustrated in FIG. 4.

Simultaneously with the precession of data from the first buffer register 44, the additional informational bits introduced into the input register will then be precessed into the second buffer register 45 through a suitable gating structure illustrated in FIG. 8. The second minor cycle counter 51 and the second major cycle counter 52 will then monitor the flow of data bits and control bits introduced into the second buffer register 45, as well as to control the precession of data bits and control bits out of the buffer register 45. It should be observed that as information is being introduced into the first buffer register 44, the input of this register 44 is inhibited. In like manner, the output of the second buffer register 45 is inhibited while information is being transferred from the first buffer register 44 to the output register 53. These functions of consecutively introducing and transferring information from the two buffer registers 44, 45 will sequentially take place so that there is no loss or delay of information generated at the keyboard *k* to the actual recording on the tape 24.

By reference to FIG. 4, it can be observed that the 24 informational bits are introduced in serial format into the output register 53. However, transference from the output register to the tape heads takes place in parallel format. An output circuit N, illustrated in FIG. 5, and which forms part of the recording circuit E, is employed to enable the transfer of the information contained in the output register 53 to a nine track magnetic recording head assembly 56. It should be recognized that FIG. 5 is divided into a composite view comprising FIGS. **5*a* and 5*b*, and which taken together detail the output circuit of FIG. 4. It can be seen that a terminal connector $t_1$ is illustrated in FIG. 5*a* and the various lines to the terminal connector $t_1$ match the mating compatible lines in the terminal connector $t_2$ of FIG. 5*b*. It should be observed that the output register 53 is divided into three major sections to accommodate three eight bit bytes of information representative of one word of 24 bits (excluding parity bits). Accordingly, each output register section 57 is capable of receiving eight bits of information. The third section 57 will contain eight data bits and the second section 57** will, in similar manner, contain eight data bits. The first data section will contain seven data bits and the one control bit which was generated by the keyboard *k*. In this manner, it can be seen that the 23 data bits and the one control bit is stored in serial fashion in the output register 53.

By further reference to FIG. 5, it can be seen that eight AND gates 58 are connected to each of the output register sections 57, each one of said AND gates being operatively associated with each bit storage position of the register 53. It can also be observed that the first AND gate 58 of each of the output register sections 57 is connected to a first track OR gate 59. The second AND gate 58 associated with each of the three sections 57 has the output thereof connected to a second track OR gate 59. In like manner, each successive AND gate 58 of the eight AND gates 58 associated with each section 57 is connected to a suitable OR gate 59. For purposes of brevity, only three AND gates have been illustrated as being associated with each output register section 57; though it should be recognized that a total of eight AND gates is associated with each output register section 57.

The output of each of the OR gates 59 is connected through an adjustable time delay 60 formed by a one-shot or the like, to a suitable recording head 61. It can be observed that the recording head assembly 56 contains the nine heads 61, each driven by a suitable amplifier 62, and having a coil 63 and pole pieces 65, as schematically illustrated in FIG. 5. The recording head assembly 56 will contain the nine heads 61 in the manner as illustrated in FIG. 5 inasmuch as nine track tape format is being employed. As the output of each of the OR gates 59 is also connected to a parity circuit 65 which is, in turn, connected through a suitable adjustable time delay 66 to a like head 61. Thus, it can be observed that since the parity circuit 65 is connected to each of the three register sections 57, that three parity bits will be generated for recording on the tape. Accordingly, one parity bit will be associated with each byte of informational bits. For example, a parity bit will be associated with the first byte of eight data bits, thereby generating nine informational bits; a second parity bit will be associated with the second byte of eight bits thereby producing nine informational bits and a third parity bit will be associated with the third sector of seven data bits and the control bit, thereby rendering nine informational bits.

The parity circuit 65 is more fully illustrated in FIG. 7 in the form of a parity tree. The parity circuit 65 includes four exclusive OR gates 67 each having a pair of inputs which are connected to the outputs of the OR gates 59 in the manner as illustrated in FIG. 5. Thus, it can be seen that the output of the eight OR gates 59 are examined together in the manner as illustrated in FIG. 7. The exclusive OR gates 67 are then connected through a pair of exclusive OR gates 68 and through an exclusive OR gate 69 to provide an odd parity output. If an even parity input is to be used, the output of the gate 69 is connected directly to the delay 66 or through a switch 72. If odd parity is desired, the switch 72 is placed in the second position to place the input of an inverter 70 in the path between the exclusive OR gate 69 and the track delay 66. Thus, it should be observed that the outputs of the three sections 57 of the output register 53, containing the 24 bits is combined to record eight tracks of informational bits on the tape 24. The nine track contains the parity bit which is generated through the parity circuit in FIG. 7. The adjustable time delays 60 and 66 are designed to provide proper alignment of all informational bits in a particular byte so that all bits fall in a line which is essentially perpendicular to the edge of the tape. In this manner, when the tape is read by the tape reader R, the bits can be read in a proper time sequence. Accordingly, it can be seen that the time delays 60 and 66 essentially serve as deskew delays.

It should be recognized that in connection with the present invention, that it is possible to add the parity bits at a point intermediate the input register 42 and the buffer registers 44, 45. However, while this may be desirable for certain purposes, it carries the attendant necessity of increasing the size of the buffer registers 44, 45 to accommodate the additional parity bits. In like manner, the remaining components would have to be adjusted to accommodate these additional parity bits.

The actual tape transports C, differ somewhat from the typical on-line computer tape drives which moves tapes in continuous or start-stop modes of operation. The tape transport of the present invention is designed to move the tape 24 in successive increments. The usual conventional incremental systems used for a synchronous data acquisition are adaptable with minor modifications for use in the present invention. In the usual incremental drive system, the drive is interlocked to the write-permit gates in such manner as to prohibit more than one pulse to be transferred to the record heads for each partial rotation of the drive capstan shaft. The drive motor is generally a multi-pole A.C. type motor with a permanent magnetic rotor driven by a bipolar D.C. signal. In this manner, each reverse of the field current causes the rotor to advance a distance equivalent to the angular space between adjacent stator poles. The velocity of the angular motion produced thereby is generally sinusoidal.

The sync. system of the present invention permits three write pulses to be generated in the time that the capstan controlling the tape motion is rotated by a single increment. As indicated previously, the three bytes which comprise one word can be written on a tape 24 with the standard spacing. A proper velocity timing profile to generate the write strobe pulses in synchronism with the movement of the tape 24 is enabled by the recording circuit E so that the delay from the time of tape increment command to the first informational bit and the time increment between subsequent bits would vary in length so that required packing density could be maintained within the tolerance requirements of a tape reader R. Accordingly, the recording circuit E includes a first delay 73 connected to the inputs of the AND gates 58. The output of the first delay 73 is connected to one input of each of the AND gates 58 associated with the second output register section 57. The output of the delay 73 is also connected to one input of a second delay 74. The other terminal of this delay 74 is connected to the input of each of the AND gates 58 associated with a third output register section 57. These delays are provided in order to accomplish a velocity profile decision which is necessary for proper recording on the tape 24.

By further reference to FIG. 5, it can be seen that the input of the delay 74 is connected to the output of the delay 73, which is connected to the output of a write gate 75. This gate 75 is provided with an input 76 which is capable of receiving a write enable signal and a second input 76' capable of receiving a write permit signal from the tape transport C. A tape ready input 76'' to the gate 75 is also connected to a pair of outputs of an R.S. type flip-flop 77. The flip-flop 77 also has an output connected to an increment pulse delay 78 which provides tape advance increment commands to the tape transport C. The gate 75 also receives sync pulses from the tape transport C over a tape sync pulse line 76'''. This same output of the flip-flop 77 which is connected to the increment pulse delay 78 is also connected to a data transfer control gate 80, the latter being associated with the first buffer register 44. The control gate 80 also receives clock pulses as schematically illustrated in FIG. 5.

By further reference to FIG. 5, it can be seen that both the first and second buffer registers 44, 45 respectively, are illustrated. Furthermore, the shift pulse control circuit for each of these buffer registers 44, 45 which form part of the output circuit are illustrated. The first shift pulse control circuit associated with the buffer register 44 comprises a buffer empty decode gate 82 and a buffer full decode gate 83, both of which are connected to the four bit major cycle counter 50 associated with the first buffer register 44, in such fashion as to decode the numerical equivalent of the data word content of the register. The gates 82, 83 are connected to an output control flip-flop 87 which, in turn, is provided with a manually operable switch 88, the latter capable of being mounted in an accessable location for easy operation. Thus, the flip-flop 87 is set when the buffer is filled and reset after the last bits of information are transferred therefrom to the tape 24 and thus, provides the subsequent circuitry with a conditioning signal refined to perform such data transfer. The output of the flip-flop 87 is connected to an OR gate 79 which also receives a minor cycle carry input in a manner to be hereinafter described. The output of the OR gate 79 is also connected to one input of the data transfer control gate 80. The output of the flip-flop 87 is also connected to a clock AND gate 89 which transmits shift pulses to the buffer register 44 through an OR gate 90, and the output register 53 by way of an OR gate 93, in the manner as illustrated in FIG. 5. Thus, it can be seen that the first shift circuit associated with the first buffer register 44 comprises the AND gates 82, 83, the flip-flop 87, the manually operable switch 88 and the AND gate 89.

The second buffer register 45 similarly has a shift circuit comprised of a buffer empty decode gate 82', a buffer fill decode gate 83', and an output control flip-flop 78', and a clock AND gate 89'. This second shift circuit operates in conjunction with the buffer register 45 in the same manner that the first named shift circuit operated in conjunction with the first buffer register 44. Again, referring to FIG. 5, it can be seen that the gates 82', 83' and 89' as well as the flip-flop 87' are all connected in the same manner as the respective components in the first shift circuit. The output of the gate 89 is connected through an OR gate 91 to provide shift pulses to the second buffer register 45 and through the output register shift pulse OR gate 93.

The outputs of each of the flip-flops 87, 87', are connected to a pair of AND gates 81, 81', which also have their outputs ored through an OR gate 92, and where the output of the OR gate 92 is connected to the reset input of the flip-flop 77. The AND gate 81 has one input which receives delayed minor cycle carry pulses from the minor cycle counter 49 associated with the first buffer register 44. In like manner, the AND gate 81' has one input which receives delayed minor cycle carry pulses from the minor cycle counter 51 associated with the second buffer register 45. It can also be seen that the output of the flip-flop 87' is connected to the OR gate 79 in the same manner as the output of the flip-flop 87. It should also be recognized that the flip-flop 87' may also be provided with a manually operable switch (not shown) similar to the switch 88.

The output register 53 receives shift pulses through an OR gate 93 which has one input connected to the clock gate 89 and one input connected to the clock gate 89'. The gate 93 also receives an input from the control gate 80. The output register 53 also receives data information from the buffer registers 44, 45 through an OR gate 94, the gate 94 having one input connected to each of the buffer registers 44, 45, respectively.

The flip-flop 87 detects the buffer register full condition of the register 44 upon satisfaction of the terms of the buffer full decode gate 83 which decodes the major cycle count. Accordingly, this count indicates that the buffer register 44 is full of informational pg,25 bits. The flip-flop 87 will be set and remain in the set condition until all of the data in this particular register 44 are transferred to the tape at which time the "buffer empty" condition will be decoded in the buffer full decode gate 83 which serves as a reset gate. The same action will take place with regard to the buffer register 45 and the control flip-flop 87'. However, it should be observed that when the buffer register 44 is in a condition where information is being transferred to the output register 53, incoming keyboard information will be introduced into the buffer register 45.

The set condition of the control flip-flop 87 or the corresponding flip-flop 87' for the second buffer 45, will, through the OR gate 79 be felt at the input of the data transfer control gate 80. As pulses are received from the tape transport C output over the tape sync line 76''', the data in the buffer register 44, or the buffer register 45, whichever is full, will be shifted through the output register 53 under the control of the minor cycle counter associated with the particular register and the internal clock signal.

The manual control switch 88 and its counterpart for the flip-flop 87' are provided for releasing information from the buffer registers 44, 45, respectively, when the last block of information entered into the registers at the end of the recording period did not fill up all bit positions.

A minor cycle carry is obtained from a minor cycle counter when either the flip-flop 87 or the flip-flop 87' are set and data is to be transferred to the tape. The OR gate 79 allows the clock gate 80 to be conditioned by either of the buffer registers which are filled with information. The gate 80 actually controls clock transfer pulses to shift data from the buffer registers to the tape via the output register, under control of the minor cycle counters inasmuch as the output data shift pulses are counted by the counters via the OR gates and the shift lines 103 and 104.

The data pulses are delayed upon transfer to the tape in the transport C by the deskew delays 60 and in addition by the second and third byte delays 73 and 74 so that in conjunction with the increment pulse delay 78, the transfer is at such a rate that the physical spacing of the data upon the tape is constant irrespective of the changing tape velocity.

The output from flip-flop 77, after a delay 78 to permit the data transfer into the output register 53, will be applied to the tape transport increment input. This input will cause the tape drive mechanism to be started. The arrival of the increment pulse will cause the tape ready line 76'' to change state to the "false" state to thereby indicate a "busy" condition. This busy condition will be sensed at the input of the AND gate 75 and together with the previously present write permit and write enable signals from the tape transport C (which indicate (a) the presence of tape and (b) that the machine is prepared to receive data) will result in an output. This output will enable the transfer of the first byte of data by means of the first set of eight AND gates 58, one of which is interfaced with each bit position in the last third section 53 of the output register 57.

By means of sequential delays provided by the two delays 73, 74, the same signal from the AND gate 75 will permit the transfer of the second and third bytes in timed relationship to tape movement. In addition, each bit of data transferred through the AND gate 58 and through the OR gate 59 will be delayed in the adjustable delays 60 by an amount of time such that the mechanical variations of the tape path and head gap location will be compensated for to "deskew" the data bits into proper physical alignment on a line perpendicular to the longitudinal axis of the tape.

FIG. 6 presents a profile of the tape velocity as a function of time. It can be seen by reference to FIG. 6 that the initial tape start command I occurs at the point labeled zero. The tape does not begin to move for some fixed period of time until the point labeled $X_1$, even though the tape start command pulse was initiated at point zero. Furthermore, it should be observed that after the time increment 0–X, the tape 24 experiences an increasing acceleration and a decreasing acceleration in a somewhat sinusoidal pattern, in the manner as illustrated in FIG. 6. The distance of 0–X, in FIG. 6 is equivalent to a fixed time delay of D.D. which is the delay inherent in the tape transport C from time of start command to the time of actual tape movement. Accordingly, after a fixed period of time, $(DD + D_1)$ from point $X_1$ to point $X_2$, a clock pulse or so-called "data transfer signal" is generated for transferring the first byte of nine bits to the recording heads 56. The time delay $D_1$ is that generated by the delay one-shot $D_1$ (FIG. 3) which is equivalent to the group of delay one-shots 60. During the period $X_2 - X_3$, which constitutes a second delay $(DD + D_2)$, a second data transfer signal is generated for transferring the second byte of information to the recording heads 56. During the period $X_3 - X_4$, which constitutes a third delay $(DD + D_3)$, a data signal is generated for transmitting the third byte of information to the recording head 56.

The delay $D_2$ (FIG. 3) is equivalent to the delay 73 in FIG. 5 and the delay $D_3$ is equivalent to the delay 74 in FIG. 5. It should also be observed by reference to FIG. 5 that write pulses $G_1$, $G_2$ and $G_3$ are generated respectively at points $X_1$, $X_2$ and $X_3$. Accordingly, the write pulse $G_1$ is generated after a time delay DD $D_2$ and the write pulse $G_3$ is generated after a time delay DD $D_3$. In this manner, the information is recorded on the tape at a variable time rate to provide a bit spacing which is held constant by adjusting the transfer rate to the velocity profile of the tape. Therefore, the tape will have a physically identical spacing between each of the informational bits recorded thereon so that the bits can be read on a standard computer type tape drive. It is to be noted that the temporal points $X_1$, $X_2$, and $X_4$ have been selected so that the same physical separation between the informational bits recorded on the tape 24 can be obtained.

FIG. 8 represents a detailed illustration of the input circuitry necessary to introduce information from the input register 42 into the two buffer registers 44, 45. The keyboard 40 which is illustrated in FIG. 4, is not included in the circuitry of FIG. 8, inasmuch as this function can conventionally be included in the keyboard *k*. Furthermore, the circuit of FIG. 8 illustrates the matrix M interposed between the keyboard *k* and the input register 42.

The data information which is introduced into the input register 42 is transferred from the input register by means of shift pulses introduced therein through a shift pulse OR gate 100. This gate 100 has one input connected to the shift pulse AND gate 108 associated with the first buffer shift line and the second connected in like manner to the shift pulse AND gate 109 associated with the second buffer. In addition, the input data shift pulses from the AND gates 108 and 109 are connected to the inputs of the minor cycle counters 49 and 50 respective through corresponding OR gates 113, 114. The output or "carry" from the minor cycle counter 49 is counted by the major cycle counter 50 to monitor the buffer register contents. In like manner, the second minor and major cycle counters 51 and 52 are controlled by shift pulses for the second buffer register 45. These inputs are also connected to the data shift OR gates 91 and 92, which are in turn, connected respectively to the two buffer registers 44, 45. These latter two gates 91, 92 provide shift pulses to the two registers 44, 45 in order to gate information out of these registers at the proper time intervals. The other two inputs to the gates 91, 92 are connected to alternate shift buses 103, 104 which are in turn, connected to the two inputs to the OR gate 93, illustrated in FIG. 5.

Data information is introduced into either of the two buffer registers 44, 45 in the manner as previously described from the input register 42 through two data input gates 105, 106, respectively. These gates 105, 106 are controlled by means of a data control flip-flop 107 which is connected to the major cycle counters 50 and 52 as well as the gates 105, 106. The data control flip-flop 107 is also connected to the inputs of two selection gates 108, 109, each being respectively associated with the minor cycle counters 49, 51. By reference to FIG. 8, it can be seen that these two inputs to the gates 108, 109 are also connected to the data input gates 105, 106 respectively.

As indicated previously, the keyboard *k* is provided with twenty-three lines to the matrix M and one additional release line. Thus, actuation of any one or more of the keys 1 on the keyboard *k* will allow the transference of clock pulses from the clock oscillator, in a manner to be more fully described hereinafter. However, each release of a key 1 on the keyboard *k* will set the data control flip-flop 107, and the flip-flop 107 will be reset by a carry pulse from either of the major cycle counters 50, 52. The flip-flop 107 is shifted back and forth between the set and reset conditions and in essence decides which of the buffer registers 44, 45 are filled with information in conjunction with the major cycle counters 50, 52. When a particular buffer register is filled with informational bits, the major cycle counter associated with the filled buffer register will toggle the data control flip-flop 107. The gates 108 and 109 control the flow of data bits to the two registers 44, 45 by being actuated to permit passage of shift pulses to either one of the two registers 44, 45 as well as the input register 42 via the OR gate 100.

The selection gates 108, 109 also receive clock information from the clock oscillator 48 through an AND gate 110. By further reference to FIG. 8, it can be seen that the OR gate 100 is also connected to the outputs of the gates 108, 109. The AND gate 110 is controlled by a clock control flip-flop 111 which receives information and is connected to the release line of the keyboard *k* and the minor cycle counters 49, 51 through an OR gate 112. Thus, when either of the minor cycle counters 49, 51 reach a full count, the flip-flop 111 will be reset to inhibit clock pulses from being shifted out of the AND gate 110. It can also be seen that the shift pulses which are applied to the buffer registers 44, 45 are also applied to the input register 42 through the gate 100 so that data is shifted out of either of the two buffer registers 44, or 45 in synchronism with the data shifted out of the input register 42.

It can thus be seen, that the three bytes of information, comprising one word can be subquentially written onto the tape by means of the nine track recording head 56. Furthermore, by controlling the writing of the informational bits on the tape to conform to the velocity profile of the tape, it is possible to obtain proper packing density with three times more bits per inch than the normal use of the machine would permit. It should also be observed that the delays 60 and 66 are capable of removing the static skew and gap-scatter errors which are produced by manufacturing tolerance build-ups, both in the tape, guiding system and in the head construction and mounting.

It can also be seen that successive operations of the stenographic machine keys 1 in predetermined combination will produce successive sections of a digital code on the magnetic tape 24 and in which each section includes the digitally encoded representative of all of the characters used in each respective line of the printed record. It should be observed that actuation of one or more of the keys on the stenographic machine will produce digital representations on the tape 24 and that the tape will be advanced by the distance of only one control pulse for actuation for one or more keys in simultaneous combinations. Thus, recording of a digital pulse on the tape 24 in one of the nine tracks constitutes a complete identity of the respective key 1 actuated on the stenographic machine S, the respective pulse being identified by a positional location on the tape 24. It should be observed that the one control pulse will only occur after 26 bits of information have been written onto the tape. Again, it should be noted that the 27 bits will be written in three sequential bytes so that nine bits will be vertically located in each of the three adjacent bytes. The sensing of a control bit will indicate the end of one word and presence of a following new word. The parity bits, which are located in each of the three bytes are designed to obviate any possibility of errors in the reading and recording process.

The code conversion matrix M, which is illustrated in FIG. 9 is essentially included in the keyboard *k* in the apparatus of the present invention. Typically, the code conversion matrix M is in the form of a diode matrix which would normally be connected directly to the contacts located directly under each of the keys 1. However, in many cases, it may be desirable to use a more complex form of code conversion matrix, depending upon the type of digital format which is to be recorded on the magnetic tape 24. In the case of the present invention, it should be observed that the actuation of any key 1 on the stenographic machine S will render a pulse representative of a character which is decernable by its location.

It is also possible to operate the apparatus of the present invention in conjunction with the stenographic machine S by using a code system similar to that described in U.S. Pat. No. 3,372,865 to F. O. Pellegrini. In this patent, which relies only upon a punched tape record, eight tracks of 24 possible punch hole bits are used to represent one or more simultaneous actuations of the keys 1. A greater redundancy and less potential for error is attained by employment of this type of code. The system of the present invention can be used with this technique by instituting a code conversion matrix M as illustrated in FIG. 9. By using this technique, one full section of magnetic tape, consisting of 24 transverse lines of recorded information is produced for each row or line of the stenographic record 3. In other words, successive operations of the stenographic machine keys in predetermined combinations will produce successive sections of a magnetic tape record in which each section includes 24 transverse rows of digitally encoded representation for each operation of one or more simultaneous actuations of the stenographic machine keys 1.

Inasmuch as the data on the tape comprises one byte of nine bits, this one byte may also be considered to represent a binary number of large numerical capacity. A further method may be employed to encode the keyboard data by means of a conversion matrix. If each key and each key combination which might be actuated is assigned a numerical value, the actuation of a key or keys could be used to derive a binary number which would uniquely represent such a keyboard operation and the resulting number could be stored on tape as a single group of nine bits. It should be noted that the complexity of such a conversion matrix would be substantial, but not without the realm of possibility if computer aided design of a large scale integrated circuit were used to provide such matrix function.

The code conversion matrix M generally consists of a diode matrix which is connected to the eight output lines illustrated in FIG. 9. It can be seen that the 23 data transfer lines in the one control transfer line extending from the stenographic machine S to the tape transport C are employed. For this purpose, the housing 10 is provided with the terminal strip 14 and the contacts 15, as illustrated in FIG. 2.

One unique advantage of this system of the present invention resides in the fact that the magnetic tape produced thereby can be read in conventional tape readers. Furthermore, a permanent record is obtained on the magnetic tape which is superior in many ways to the paper tape record produced by the stenographic machine S in that the magnetic tape can be stored in a small compact area, thereby eliminating the need for the large storage area necessary for reams of paper tape. In addition, much more data can be stored per lineal inch of storage medium and higher velocities are possible so that computer input can take place at a faster rate with the attendant cost savings.

As indicated previously, the magnetic tape 3 can be read by any conventional tape reader R. The output of the tape reader R is then transmitted to conventional digital computing equipment for preparation of the transcription of the subject matter recorded on the tape 24. FIG. 10 illustrates the relationship between the printed tape record produced by the stenographic machine S and the magnetic tape record produced by the present invention. As noted previously, three full lines of transverse tape is encoded for each row or line of the printed tape record produced by the stenographic machine; the three transverse lines representing the three bytes or one complete word. By further reference to FIG. 10, it is to be noted that the first printed line includes only the character T on the printed record 2 of the stenographic machine S and thus, the first section of the record magnetic tape 24 that is the first row, is recorded with a dot and a location representative of the character T. The following two rows, representing the two remaining bytes to constitute one word will include only the parity bits and the control bit. The next row on the printed record 2 bears a series of reference letters which are, in turn, correlated to the second group of three rows on the magnetic tape record 3.

In like manner, a magnetic tape record, similar to that illustrated in FIG. 11, would be produced if the code system employed in U.S. Pat. No. 3,372,865 is used in the present invention. In this case, six successive sections of the magnetic tape record are illustrated, one on top of the other to more clearly show the relationship between the two record forms; but it should be understood that the successive sections are produced end-to-end so as to constitute the length of the magnetic tape. In like manner, single control dots would be recorded in the upper right hand corner above the level of the rows of eight digital representing dots. This single dot indicates an edge of a section of tape containing the information representing a single line of the printed tape from the stenographic machine S, and does not represent a part of the record information. In this system, the first printed line of the record 2 includes the character T and thus, the first section of the magnetic tape record 24 is recorded with a series of dots in one vertical row only, the row corresponding in position to the lateral position to the character T within the printed record 2. This pattern of digitally encoded pulses on the magnetic tape represents the character T according to an alpha-numeric code, selectively employed in computer usage.

By further reference to this system employing the code of U.S. Pat. No. 3,372,865, it can be seen that the second printed line has five characters and in the section of the magnetic tape corresponding to the line, five vertical rows are recorded with pulses representative of the digital code. The pattern in each row is distinctive and represents the respective character in the alphanumeric code mentioned previously.

It should be recognized that the tape transport C of the present invention along with the recording circuit E is not limited to use in systems for producing a record corresponding to a stenographic record. The tape transport C and attendant circuitry can be effectively employed as a device for recording any type of digital data at either a proximate or remote site. For example, one could take the output of a device, convert the output to a digital code through the code conversion matrix and transmit the data to the tape transport C at a remote site. The transport would then effectively record the information on the tape 24 for ultimate processing. As another example, the system of the present invention could be used as a level sensing network and suitable analog to digital converter where a particular voltage is assigned to a numerical value in binary form on the tape, so that when the tape is moved, signals are recorded thereon. The code thereon can be examined to determine the amplitude of current or voltage at selected intervals of time. In essence, in the system of the present invention, it can be used for the recordation of any type of digital signals and for the ultimate preparation of a digital tape from a keyboard. The system of the present invention could also be used as a computer input or to prepare magnetic tapes for machine control. In the latter employment, the system of the present invention would be used to generate a tape by a keyboard input necessary to control machine tools.

The translating computer T, used in the system of the present invention, is properly programmed in order to produce a printed transcription 4 from the digital code which is introduced into the computer T. However, it should be recognized that the computer T can be so constructed as to provide recordation of phonetic sounds which can be addressed by the output of the stenographic machine. Every language such as the English Language, includes technical jargon, various types of idiomatic forms and other unorthodox constructions. The computer T must be programmed to recognize these various forms of the language as well.

Further, in human speech, there is essentially a maximum of about 200 phonetic sounds. By recording each of these sounds in a proper track on a magnetic drum or similar storage medium in the computer, it is possible to obtain an acoustic translation as opposed to a printed translation. The acoustic translation would be produced on an audible tape where a stenographer could produce a typewritten record transciption or other printed transcription from the audible tape. Since a symbol is used to represent a sound on the stenographic machine S, a sound can be made when the symbol is recognized by the computer. Accordingly, each channel on the "drum" of the computer is identified by a single sound or a group of phonetic sounds. The phonetic code is of course generated by the stenographic machine. If the drum of the computer is continuously operating during the time that the code from the stenographic machine S is introduced into the computer, the various combinations of characters represented by the digital code introduced into the computer will select the proper phonetic sounds in proper sequence to reconstruct an audible understandable facsimile of the original conversation.

Two problems are inherent in the use of an audible transcription. The first of these problems resides in the fact that there is no mechanism in the conventional stenographic machine for identifying punctuation. The second of these problems is that there is no mechanism on the stenographic machine for a placement of accent on or within the word used in the original conversation. This problem is easily obviated by introduction of an additional set of keys on the stenographic machine S which is capable of coding a particular symbol to produce an accent or emphasis on a particular symbol. In addition, suitable keys could be added for introducing punctuation.

It should be recognized that the computer T could produce the audible output transcription from a printed tape record of the type described in U.S. Pat. No. 3,372,865, now U.S. Reissue Pat. No. Re. 26,981, or from a photographic record of the type described in pending application Ser. No. 858,803, filed Sept. 17, 1969.

It is possible to provide a modified form of recording circuit E' which is more fully illustrated in FIG. 12. The modified form of recording circuit employs a dual memory unit which substantially increases storage capacity. In the circuit E', the keyboard *k* is connected to an input register 120 which receives clock pulses from a clock oscillator 121. The input register 120 which is connected through a suitable gating structure 122 to a first memory 123 or a second memory 124. The memories 123, 124 could be conventional magnetic memory cores or integrated circuit memories.

The clock oscillator 121 is also connected to a first address and cycle control 125 which is in turn, connected to the memory 123 and to a second address and cycle control 126 which is also, in turn, connected to the second memory 124. Each of the memories 123, 124 would have a storage capacity of 4,096 words with eight bits per word. The input register 120 would introduce information first into the memory 123 and when the memory 123 was full, as determined by the address and cycle control 125, the gating structure 122 would enable the input register 120 to introduce information into the second memory 124. Simultaneously with introduction of information into the second memory 124, the information in the first memory 94 would be introduced into an output register 127. Each memory would have eight lines connected to the output register 127 so that the information in the memory could be introduced into the output register 127 in parallel format. The output register would then be materially simplified and would still be capable of writing the word onto the tape in three bytes as previously described. Each address and cycle control 125, 126 would be connected to a start-stop control 128 which would be connected to the tape transport C. However, by use of a large storage capacity, it would not be necessary to use an incremental drive tape transport, since the storage capacity would contain sufficient information to provide computer format blocks on the tape at the tape transport rate of operation.

By reference to FIG. 13, it can be seen that the magnetic tape would have a beginning marker labeled "BOT" representing the beginning of the tape and the tape would have a terminal marker labeled "EOT" representing the end of the tape. Furthermore, it can be seen that the tape would have one word recorded thereon in three bytes and there would exist an inter-record gap between groups of words corresponding to memory capacity.

It should be recognized that the output register could be eliminated in the circuit E' by merely substituting the write electronics such as the write amplifiers, deskew delays, etc. however, inasmuch as each word in the memory contains eight bits, three write functions would be performed to write the entire word comprised of three bytes onto the tape. The output register would be useful in the circuit E' in the event that logic conversion were desired.

It should also be observed that the memories 123, 124 could be replaced by one split cycle mode, or so-called interlace mode memory. In this construction, the address and cycle control 125 would serve as a read cycle counter and the address and cycle control 126 would serve as an output counter.

It is also possible to employ a recording circuit F' as illustrated in FIG. 14, which employs a single memory 130 connected to the output circuit 131, the latter being similar to the output circuit 53 previously described. In this case, the memory would be capable of storing one 23 bit word in a single address. All of the bits of this entire word would be introduced into the output register simultaneously. Accordingly, the output register would thus enable the three bytes of information to be written sequentially onto the tape. It should be observed that in this type of circuit, the same matrix or OR gates would be employed as illustrated in FIG. 5. However, for purposes of simplicity, only two such OR gates $Tr_1$ and $Tr_2$ are illustrated, representing two such tracks of the nine track tape. In like manner, a parity circuit $Tr_9$ is illustrated for generating the parity bit associated with each byte recorded on the tape.

It should be understood that changes and modifications can be made in the form, construction, arrangement and combination of parts presently described and pointed out without departing from the nature and principle of my invention.

Having thus described my invention, what I desire to claim and secure by letters patent is:

1. Apparatus for producing a digitally encoded member in response to external signals and which is capable of being read by digital type equipment, said apparatus comprising:

a. means for generating a plurality of informational bits in a digital code in response to receipt of said external signals, b. a plurality of said informational bits being grouped into a byte of said bits and a plurality of bytes being representative of one word, and where each of said bytes thus formed contains the same number of bits and each word contains the same number of bytes, c. first storage means for temporarily retaining a group of said informational bits, d. second storage means cooperatively associated with said first storage means for temporarily retaining a group of said informational bits, e. output means operatively connected to said first and second storage means to receive informational bits from each said storage means at properly selected times and presenting the received informational bits to a record member for recordation thereon to thereby produce said digitally encoded member, f. a first major cycle counter means and a cooperating first minor cycle counter means operatively associated with said first storage means for controlling informational capacity of said first storage means and to enable storage of informational bits in said first storage means until said storage means is filled to capacity thereof, g. a second major cycle counter means and a cooperating second minor cycle counter means operatively associated with said second storage means for controlling informational capacity of said second storage means and to enable storage of informational bits in said second storage means after filling said first storage means to capacity thereof, h. said first and second minor cycle counter means counting each informational bit in each word as said bits enter the associated respective first and second storage means, i. said first and second major cycle counter means determining the number of words entering into the associated respective first and second storage means, j. switching means operatively associated with said monitoring means to enable transference of information to said output means after said first storage means has achieved capacity level and simultaneously permit said monitoring means to enable storage of informational bits into said second storage means, k. and means operatively associated with said output means to enable the recordation of bits so that the bits of at least one byte may be simultaneously recorded transversely across said record member and bytes representative of a word recorded in a grouping on said record member.

2. The apparatus for producing a digitally encoded member of claim 1 further characterized in that a clocking source is operatively associated with said first major cycle counter means and first minor cycle counter means and second major cycle counter means and second minor cycle counter means to permit introduction of informational bits into each said storage means and to said output means on a synchronous time basis.

3. The apparatus for producing a digitally encoded member of claim 1 further characterized in that each informational bit in each word is characterized by its location on said record member and where the location of the bit on said member renders it distinct from other bits characterized by location on said record member.

4. An apparatus for recording information on a record member on a transport in temporal relationship with respect to incremental movement of said member past a recording element, and in which said record member moves at non-linear velocities during portions of the time that segments thereof pass said recording element; said apparatus comprising means for generating a plurality of bits representative of one word of information and where the bits representative of one word are divided into a plurality of bytes, first temporary storage means and second temporary storage means cooperating with said first temporary storage means for temporarily storing said bits of information, monitoring means operatively connected to said first and second temporary storage means to successively control storage of bits therein and to permit successive output of bits therefrom, means for generating an increment command signal to initiate movement of said record member, first delay means preventing presentation of said informational bits to said recording element for a predetermined period of time after initiation of movement of said record member, output means operatively associated with said recording element and said first delay means to enable presentation of a first of said plurality of bytes of informational bits to said recording element, means operatively associated with said first delay means for generating a first record command signal for recordation of said first byte of informational bits on said record member and where all of the bits of said first byte are recorded substantially simultaneously on said record member when said record member is moving at a nonlinear velocity past said recording element, second delay means for preventing presentation of subsequent of said plurality of bytes of bits forming one word to said recording element for preestablished time periods, means operatively associated with said second delay means for generating subsequent record command signals to thereby enable recordation of all of said bytes on said record member when said record member is moving at a non-linear velocity past said recording element, means operatively associated with said last named means to generate said subsequent record command signals in proper timed relationship with respect to movement of said record member in a velocity profile so that all of said bytes are substantially equally spaced on said record member to obtain equal packing density of bits thereon.

5. The apparatus of claim 4 further characterized in that said record member is a magnetic record member and that said recording element is a magnetic recording head assembly.

6. The method of producing a digitally encoded record in response to external signals and which record is capable of being interfaced to digital type equipment, said method comprising:

a. generating a plurality of informational bits in a digital code in response to receipt of said external signals, b. forming said plurality of said informational bits into a plurality of bytes containing said informational bits and grouping a plurality of bytes to represent one word, and when all of said bytes thus formed contains the same number of bits and each word contains the same number of bytes, c. temporarily storing said informational bits representing a plurality of words in a first storage medium until capacity thereof is achieved, d. counting the number of bits in each word entering the first storage medium and substantially simultaneously therewith, e. counting the number of words entering the first storage medium for controlling the informational capacity of said first storage medium and thereby determining when said first storage medium is filled to capacity, f. thereafter storing said informational bits as generated in a second storage medium until capacity thereof is achieved and simultaneously transferring out of the first storage medium the informational bits contained in said first storage medium, g. counting the number of bits in each word entering the second storage medium and substantially simultaneously therewith, h. counting the number of words entering the second storage medium for controlling the informational capacity of said second storage medium and thereby determining when said second storage medium is filled to capacity, i. transferring out of the first storage medium the informational bits contained therin simultaneously with the storing of informational bits in said second storage medium, j. simultaneously recording of all of said informational bits in at least one byte on a record member in timed relation to the movement of the member and in a direction transverse to the movement of the record member, k. and successively recording the bytes representative of one bit in successive transverse spaces across the record member to thereby produce a digitally encoded record in response to the external signals.

7. The method of producing a digitally encoded record of claim 6 further characterized in that the informational bits in any of the bytes comprising one word is characterized by its location in any of the bytes of one word with respect to each of the other informational bits comprising the word.

8. The method of producing a digitally encoded record of claim 6 further characterized in that recording on the record member is delayed for a predetermined time period after commencement of movement of said record member to insure that all of the informational bits of one byte are substantially simultaneously recorded on the record member.

9. The method of producing a digitally encoded record of claim 6 further characterized in that recording on the record member is delayed for a perdetermined time period after commencement of movement of said record member to insure that all of the informational bits of one byte are substantially simultaneously recorded on the record member, and recording between subsequent bytes of a word is delayed for a predetermined time period to insure that all bytes representative of one word are sequentially recorded on the record member and to enable proper packing density of all bytes comprising one word.

10. The method of producing a digitally encoded record of claim 6 further characterized in that recording on the record member is delayed for a predetermined period of time after movement of said record member to insure that all the informational bits of one byte are substantially simultaneously recorded on said record member after initiation of movement of said record member, and a data transfer pulse is generated to record the bytes at a variable time rate on said record member when moving at a non-linear velocity to insure proper spacing and packing density and so that the plurality of bytes of informational bits are recorded on said record member in substantially equal spacing.

11. The method of producing a digitally encoded record of claim 6 further characterized in that a control bit is generated in each byte of a word to enable proper recording on the record member.

* * * * *